United States Patent
Ono et al.

(10) Patent No.: US 7,297,473 B2
(45) Date of Patent: Nov. 20, 2007

(54) METHOD OF FORMING A MICROLENS ARRAY HAVING A HIGH FILL FACTOR

(75) Inventors: Yoshi Ono, Camas, WA (US); Bruce D. Ulrich, Beaverton, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 86 days.

(21) Appl. No.: 11/270,701

(22) Filed: Nov. 8, 2005

(65) Prior Publication Data

US 2007/0105056 A1    May 10, 2007

(51) Int. Cl.
*G02B 3/00* (2006.01)

(52) U.S. Cl. ............... 430/321; 430/330; 430/394; 216/26

(58) Field of Classification Search .............. None
See application file for complete search history.

(56) References Cited

U.S. PATENT DOCUMENTS

| | | | |
|---|---|---|---|
| 5,324,623 A | | 6/1994 | Tsumori |
| 5,835,274 A | * | 11/1998 | Baek ..................... 359/619 |
| 6,163,407 A | | 12/2000 | Okazaki et al. |
| 6,417,022 B1 | | 7/2002 | Hsiao et al. |
| 6,495,813 B1 | | 12/2002 | Fan et al. |
| 6,995,911 B2 | * | 2/2006 | Boettiger ................. 359/618 |

FOREIGN PATENT DOCUMENTS

JP           7-198906 A  *  8/1995

* cited by examiner

Primary Examiner—John A. McPherson

(57) ABSTRACT

A method of forming a microlens array includes preparing a substrate; fabricating a photosensitive array on the substrate; depositing a layer of lens material on the photosensitive array; depositing and patterning photoresist on the lens material, wherein patterning includes forming a photoresist region having a solid curved upper surface and a substantially rectangular base on the lens material layer; developing the photoresist; reflowing the photoresist; and processing the lens material for form a microlens array.

11 Claims, 6 Drawing Sheets

PHOTORESIST MOUND WITH A SQUARE FOOTPRINT

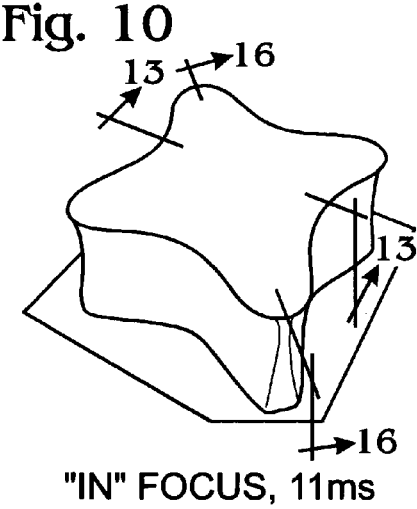
"IN" FOCUS, 11ms
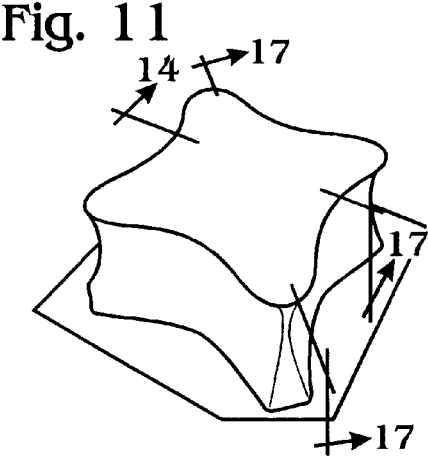
0.6μm DEFOCUS, 120ms
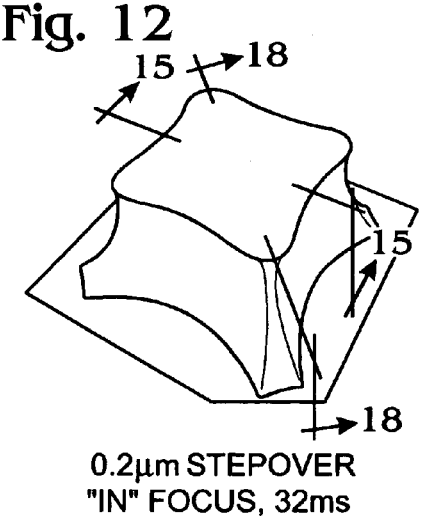
0.2μm STEPOVER "IN" FOCUS, 32ms

METHOD OF FORMING A MICROLENS ARRAY HAVING A HIGH FILL FACTOR

FIELD OF THE INVENTION

This invention relates to CCD and CMOS sensors, and specifically to a method efficiently to fabricate lenses for such sensors.

BACKGROUND OF THE INVENTION

The light forming a real-world image which is focused onto an imaging device has an inherent efficiency for detection. The photon flux through an aperture falls onto the sensor surface and is converted into electrical signals which are ultimately stored as digital images. Each pixel of the stored image is typically composed of signals from three individual photodetectors corresponding to the three fundamental colors of the red, green, blue (RGB) domain, or the complimentary cyan, magenta, yellow (CMY) domain. The intensity of the electrical signal is roughly proportional to the quantity of photons impinging each photodetector. A lens, or microlens, is typically used to focus the incoming light onto the active area of each photodetector. The microlens may be formed by any set of process steps which generate a convex shaped lens having a high refractive index, e.g., >1.5, material located between the light source and the photodetector.

Typical lens formation processes include resist reflow or dielectric material reflow techniques. After the reflow process, a hemispherical profile having a circular footprint results. The fill factor, defined as the ratio of lens to cell areas, for a circular footprint, when just touching neighboring cells, is about 79%.

U.S. Pat. No. 5,324,623, to Tsumori, granted Jun. 28, 1994, for Microlens forming method, describes a method of forming a microlens made of a thermoplastic resin on a solid-state imaging device, and more particularly to a microlens forming method which can form a microlens made of a thermoplastic resin on a solid-state imaging device which is highly accurate, having a fine pattern of 0.5 µm or less.

U.S. Pat. No. 6,163,407, to Okazaki et al., granted Dec. 19, 2000, for Microlens array and method of forming same and solid-state image pickup device and method of manufacturing same, describes a microlens array in which a plurality of microlenses are arranged, a method of forming the microlens array, a solid-state image pickup device having the microlens array, and a method of manufacturing the solid-state image pickup device.

U.S. Pat. No. 6,417,022, to Hsiao et al., granted Jul. 9, 2002, for Method for making long focal length micro-lens for color filters, describes a method for fabricating microlenses for color filters and devices, and more particularly, relates to a method for fabricating long focal length microlens for color filters and devices fabricated by such a method.

U.S. Pat. No. 6,495,813, to Fan et al., granted Dec. 17, 2002, for Multi-microlens design for semiconductor imaging devices to increase light collection efficiency in the color filter process, describes optical design and microelectronic fabrication of microlens arrays for the optimization of spectral collection efficiency and related photodetector signal contrast in the color filter process of semiconductor imaging devices.

SUMMARY OF THE INVENTION

A method of forming a microlens array includes preparing a substrate; fabricating a photosensitive array on the substrate; depositing a layer of lens material on the photosensitive array; depositing and patterning photoresist on the lens material, wherein patterning includes forming a photoresist region having a solid curved upper surface and a substantially rectangular base on the lens material layer; developing the photoresist; reflowing the photoresist; and processing the lens material for form a microlens array.

It is an object of the invention to produce convex lens shapes in a high refractive index material for the purpose of concentrating photons impinging on the surface of a film onto the active photodetector element.

This summary and objectives of the invention are provided to enable quick comprehension of the nature of the invention. A more thorough understanding of the invention may be obtained by reference to the following detailed description of the preferred embodiment of the invention in connection with the drawings.

BRIEF DESCRIPTION OF THE DRAWINGS

FIGS. 10-18 depicts three photoresist wall profiles according to three embodiments of the method of the invention.

DETAILED DESCRIPTION OF THE PREFERRED EMBODIMENTS

A method to generate hemispherical profiles having rectangular footprints is described to produce a lens array with a fill factor near unity. Improvement in the light collection efficiency for image sensing in CCD and CMOS imagers may be realized from devices constructed according to the method of the invention.

The method of the invention produces convex lens shapes of a high refractive index material for the purpose of concentrating photons impinging on the surface of a film onto an active photodetector element. This method offers an advantage of a high fill factor, having a value of up to and including unity. The dimensions of the lens may be made extremely small, having a scalability to approximately a 0.5 micron diameter. Once the photoresist pattern has been reflowed, the concave shape is transferred to the underlying lens material through appropriately developed dry etch processes.

Figure 2:
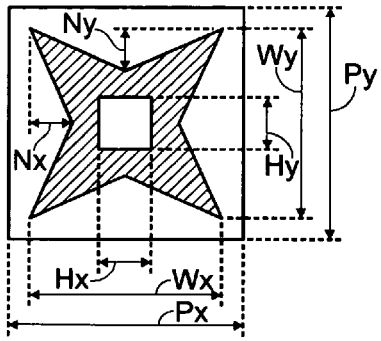
FIG. 2 is a top plan view of a microlens unit.
Figure 3:
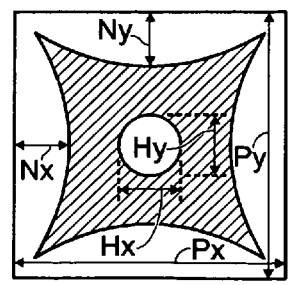
FIG. 3 is an alternate embodiment of the microlens unit of FIG. 2.

The method of the invention includes three embodiments, which will be discussed later herein, wherein each embodiment produces the same final result: i.e., a parabolic lens profile having a rectangular footprint. The three embodiments are: 1) "In" Focus; 2) Defocus and 3) Step-over. Each of the three embodiments of the method of the invention use a variable notch size and may incorporate a variable hole size. These variables are shown in FIG. 2. As an alternative to the straight edges of FIG. 2, curves may be used, similar to what is shown in FIG. 3. FIG. 2 is a top view of a layout of a microlens unit cell showing the variables of notch and hole size. FIG. 3 is an alternative to the straight edges of FIG. 2.

The variables shown in FIG. 2 each has an x and a y component. For ease of explanation, the x and y aspects are depicted with the same aspect, i.e., a square lens arrays. The unit cell has a pitch size, P, a pattern width, W, a notch size, N, and a hole size, H.

Figure 4:
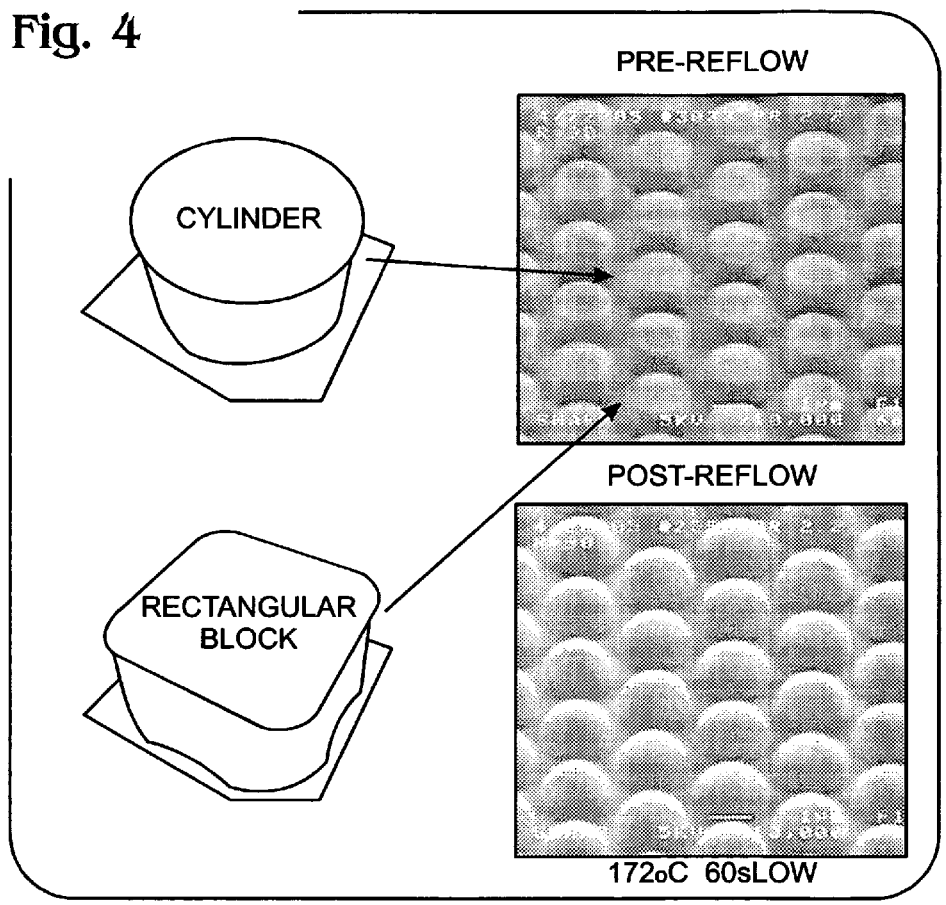
FIG. 4 depicts the results of photoresist reflow.

When the temperature during the photoresist reflow is high enough, e.g., between about 150° C. to 180° C., and the time long enough, e.g., about 60 seconds, the patterned photoresist relaxes and flows, ultimately into a hemispherical mound having a circular footprint as a result of surface tension, as in the case of formation of a soap bubble. This is exactly what happens when the initial pattern, before reflow, is either a cylinder or a rectangular block. FIG. 4 depicts this transition, wherein a hemispherical profile and a circular footprint results when the photoresist has been reflowed.

Figure 5:
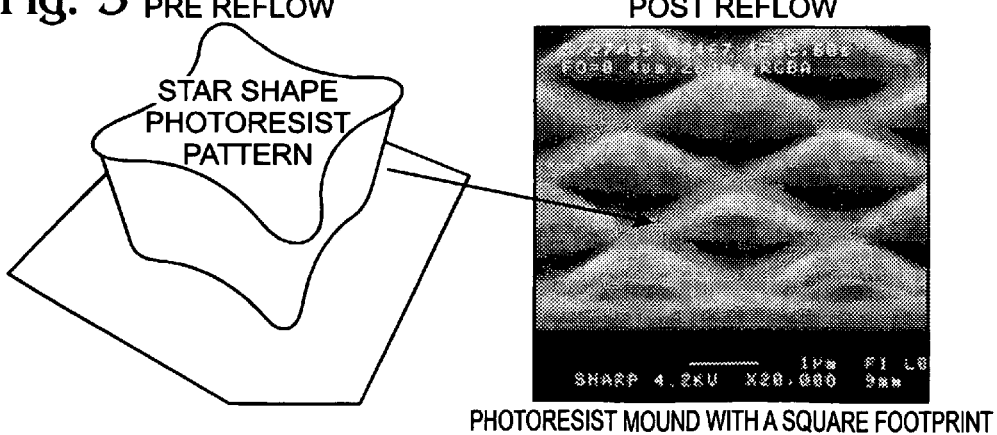
FIG. 5 depicts transformation of photoresist "star" pattern into a hemispherical profile.

When the initial photoresist pattern is modified in a shape similar to the one shown in FIG. 2, the reflow pattern relaxes and yields a parabolic profile having a square footprint. This is shown in FIG. 5, wherein a "Star" shaped photoresist pattern becomes a hemispherical profile having a square footprint following the reflow process.

Figure 6:
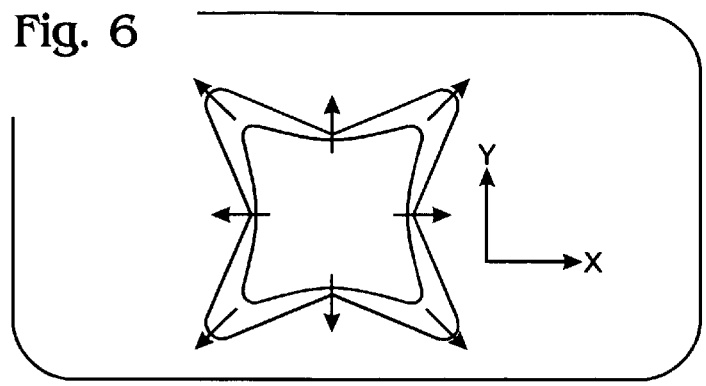
FIG. 6 depicts a square footprint for a particular time and temperature combination.

The formation of a square footprint using a notch of value, N, will now be discussed. There are two essential factors for forming a square footprint: the first is the flow front, which now has a different shape; and second, the amount of photoresist, which becomes depleted at the corners of the star pattern. The rate that the resist flows is a function of the amount of photoresist available to drive the flow front outward. FIG. 6 depicts a square footprint for the proper temperature/time combination, and depicts a horizontal flow vector, on the right center of the figure, which moves outward in the x direction more than does the bottom right or the top right flow vector.

Figure 7:
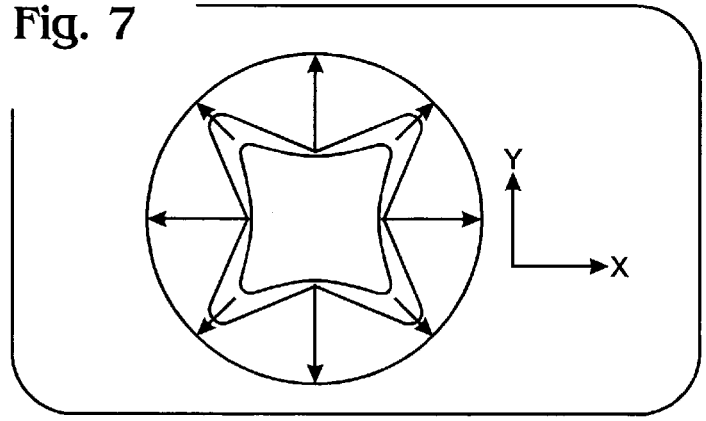
FIG. 7 depicts a circular footprint for a particular time and temperature combination.

If the reflow continues, surface tension and photoresist depletion at the corners change the footprint from a square to a circle, as shown in FIG. 7, wherein a circular footprint results for a larger reflow distance than that of FIG. 6, by increasing either or both the temperature/time combination.

Figure 1:
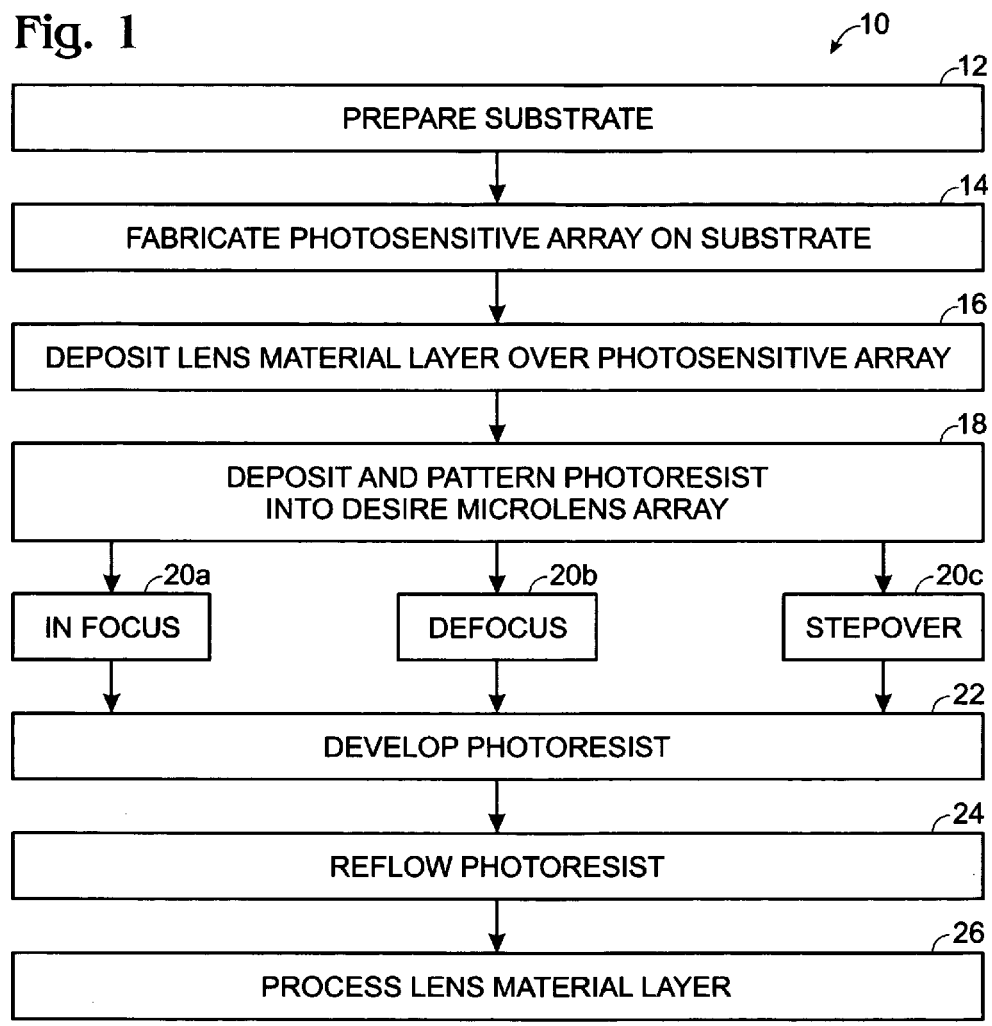
FIG. 1 is a block diagram of the method of the invention.

Referring to FIG. 1, the method of the invention is depicted generally at 10, and includes preparation of a substrate 12, and the fabrication of a photosensitive array on the substrate 14. Each photodetector in the photosensitive array is equipped with suitable electrical connections. A layer of lens material is deposited 16 over the photosensitive array. A layer of photo resist is deposited an patterned 18 using one of the three embodiments of the patterning technique of the method of the invention 20. The photoresist is then developed 22, and reflowed 24. The lens material is then processed 26 into a microlens array overlying the photosensitive array.

The "In" Focus Embodiment

This is the preferred embodiment of the method of the invention for the formation of a mound of photoresist having a parabolic profile and a square, or rectangular, footprint, 20*a*. The following data is from a specific study, whereas the values of the variables may be changed for the general case. The variables are the following: Px, Py, Wx, Wy, Nx, Ny, Hx, Hy, Te, and Ti, where P=the cell pitch, W=the pattern size, N=the notch size, H=the hole size, Te=the reflow temperature, and Ti=the reflow time. The variables P, W, N, and H are shown in FIG. 2.

The specific study used a square lens array where Px=Py=2.2 µm, Wx=Wy=1.8 µm, Nx=Ny=0.4 µm and Hx=Hy=0.4 µm. The reflow process used a hot plate with Te=170° C. and Ti=60 seconds. The exposure used was 126mj/cm$^{-2}$ with a focus value of 0 µm. The developer used was a Tetramethylamoniumhydroxide (TMAH), 0.28 wt % solution and the development time was about 60 seconds.

The provision of a hole has two primary functions. One function is to modify the amount of photoresist available for reflow. This modifies the flow vectors of the flow fronts that control the footprint shape. The other function of the hole is to produce different parabolic profiles. For example, one may want to produce different lens curvatures within the lens array. If one wants to target three wavelengths, e.g., red, green, and blue, then the hole size would be Hr<Hg<Hb, respectively.

The reflow distance, R, is defined as (P−W)/2. This is the distance that the photoresist spreads outward from the initial pattern before the reflow process is enacted. With the proper reflow temperature/time combination the desired footprint is a rectangular footprint, thereby filling the entire lens cell. This makes the fill factor, FF=the ratio of lens to cell area, equal to unity. When FF=1, optimum light collection efficiency is obtained.

The Defocus Embodiment

Figure 8:
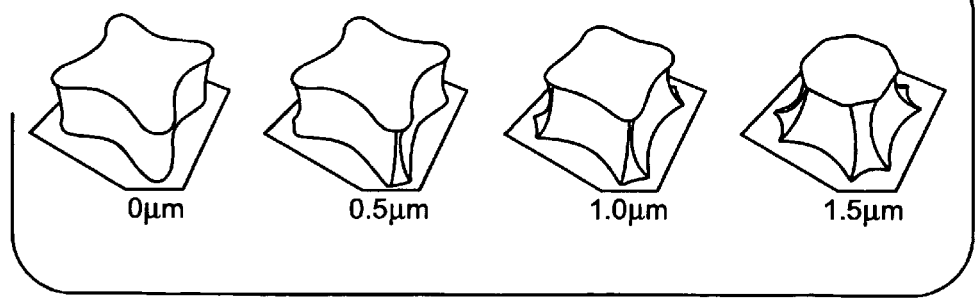
FIG. 8 depicts various volumes of photoresist available for reflow as a function of focus.

When the reflow distance, R, needs to be larger than that used in the "in" Focus embodiment, this alternative embodiment 20*b* may be used to produce a parabolic profile having a rectangular footprint. With this embodiment, a sloped photoresist wall profile results. This modifies the reflow front vectors in such a way that the center vectors now have a magnitude less than that of the "in" Focus embodiment because of more photoresist depletion as a lesser amount of photoresist is now for reflow. The corner vectors are still less than the center vectors. For a particular Te/Ti combination, a rectangular footprint is obtained. The wall profile can be seen to vary in FIG. 8, which depicts the volume of photoresist available for reflow as a function of focus.

Figure 9:
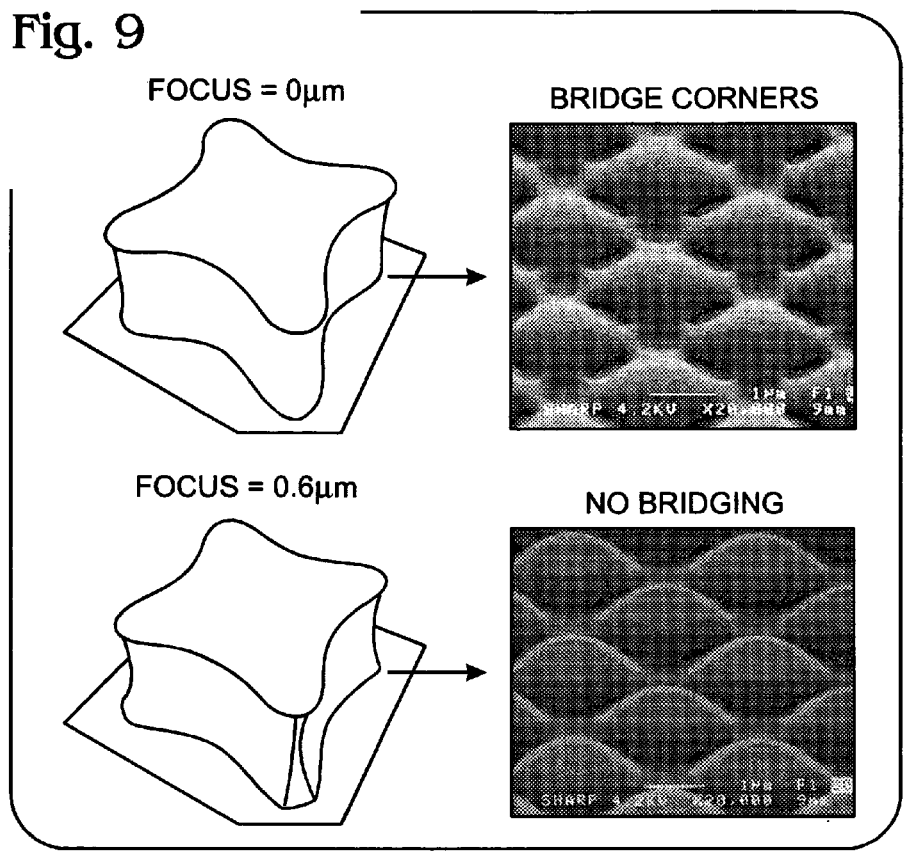
FIG. 9 depicts a bridging effect and a no bridging effect using an "in" focus embodiment of the invention.

To demonstrate the difference of the "in" Focus embodiment versus the Defocus embodiment, a comparison was performed on the same wafer. The only difference in the photoresist formed on the comparison wafer was during the printing of the initial pattern before the reflow process. The same pattern was printed across the wafer, however, one portion of the wafer was patterned using a focus value of 0 µm and the other portion of the wafer was patterned using a focus value of 0.6 µm. The wafer was then developed and reflowed. FIG. 9 depicts bridging near the corners of the unit cell when the "in" Focus embodiment was used while the Defocus embodiment shows no bridging. Bridging occurs near the corners of the "in" Focus embodiment because more photoresist is available for reflow. The use of the hole is an option which may be used to reduce the amount of photoresist available for reflow.

The Stepover Embodiment

The Stepover embodiment 20*c* may be invoked as an option to the Defocus embodiment. The resultant photoresist wall profile is similar to that of the Defocus Embodiment. A depiction of this wall profile is shown in FIGS. 10-12, where the three embodiments are compared, and in FIGS. 13-18, which are cross-section elevations taken along the lines 13-18 in FIGS. 10-12.

Figure 19:
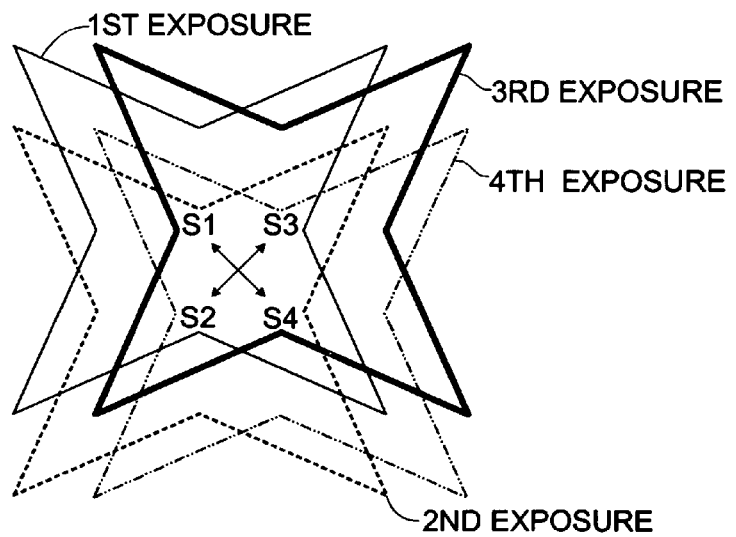
FIG. 19 depicts a 4× stepover print showing the positions of each exposure.
Figure 15:
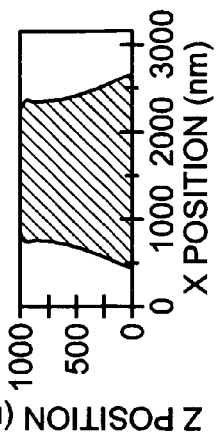
Figure 14:
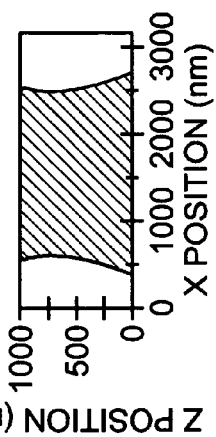
Figure 13:
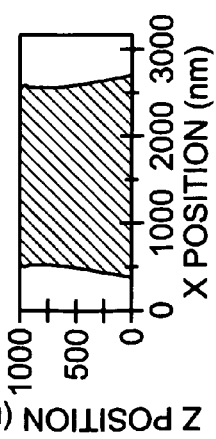
Figure 18:
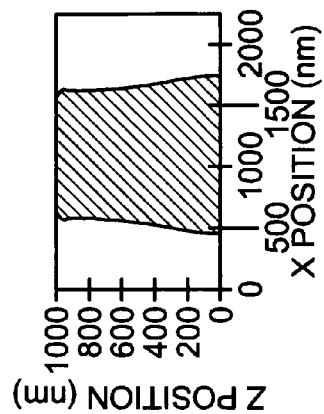
Figure 17:
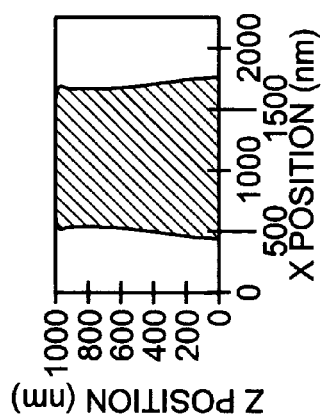
Figure 16:
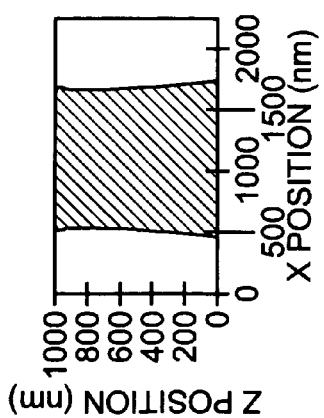

The Stepover embodiment incorporates four separate exposures to form a single composite pattern. The shift distance, S, is measured from the composite center. This is shown in FIG. 19. For a special case study the following values were used:

TABLE 1

| Exposure | $S_x$ | $S_y$ |
|---|---|---|
| 1 | −0.2 μm | +0.2 μm |
| 2 | −0.2 μm | −0.2 μm |
| 3 | +0.2 μm | +0.2 μm |
| 4 | +0.2 μm | −0.2 μm |

Referring now to FIG. 19, a 4× Stepover print shows the positions of each exposure. The use of the hole is an option that can be used.

Thus, a method of forming a microlens array having a high fill factor has been disclosed. It will be appreciated that further variations and modifications thereof may be made within the scope of the invention as defined in the appended claims.

We claim:

1. A method of forming a microlens array comprising:
preparing a substrate;
fabricating a photosensitive array on the substrate;
depositing a layer of lens material on the photosensitive array;
depositing and patterning photoresist on the lens material, wherein said patterning includes forming a photoresist region having a solid curved upper surface and a substantially rectangular base on the lens material layer, and which further includes patterning the photoresist region in a pattern taken from the group of patterns consisting of star-shaped photoresist patterns and cylindrical-shared photoresist patterns;
developing the photoresist;
reflowing the photoresist; and
processing the lens material for form a microlens array.

2. The method of claim 1 wherein said patterning includes patterning the photoresist into a pattern having a hole adjacent the center of the pattern.

3. The method of claim 1 wherein said patterning includes patterning the photoresist with a focus value of 0 μm.

4. The method of claim 1 wherein said patterning includes patterning the photoresist with a focus value of greater than 0 μm up to about 0.6 μm.

5. The method of claim 1 wherein said patterning includes patterning the photoresist with multiple exposure of the same pattern, wherein each exposure shifts the pattern by a shift distance.

6. A method of forming a microlens array comprising:
preparing a substrate;
fabricating a photosensitive array on the substrate;
depositing a layer of lens material on the photosensitive array;
depositing and patterning photoresist on the lens material, wherein said patterning includes forming a photoresist region having a solid curved upper surface and a substantially rectangular base on the lens material layer, and which includes patterning with a focus value of between about 0 μm to about 0.6 μm, and which further includes patterning the photoresist region in a pattern taken from the group of patterns consisting of star-shaped photoresist patterns and cylindrical-shared photoresist patterns;
developing the photoresist;
reflowing the photoresist; and
processing the lens material for form a microlens array.

7. The method of claim 6 wherein said patterning includes patterning the photoresist into a pattern having a hole adjacent the center of the pattern.

8. A method of forming a microlens array comprising:
preparing a substrate;
fabricating a photosensitive array on the substrate;
depositing a layer of lens material on the photosensitive array;
depositing and patterning photoresist on the lens material, wherein said patterning includes forming a photoresist region having a solid curved upper surface and a substantially rectangular base on the lens material layer, including patterning the photoresist with multiple exposure of the same pattern, wherein each exposure shifts the pattern by a shift distance;
developing the photoresist;
reflowing the photoresist; and
processing the lens material for form a microlens array.

9. The method of claim 8 wherein said patterning includes patterning the photoresist into star-shaped photoresist patterns.

10. The method of claim 8 wherein said patterning includes patterning the photoresist into cylindrical-shaped photoresist patterns.

11. The method of claim 8 wherein said patterning includes patterning the photoresist into a pattern having a hole adjacent the center of the pattern.

* * * * *